Patented Oct. 26, 1948

2,452,235

UNITED STATES PATENT OFFICE 2,452,235

BLACKBOARD

Leon J. Gold, Shorewood, Wis., assignor to Milprint, Inc., Milwaukee, Wis., a corporation of Delaware No Drawing. Application March 2, 1946, Serial No. 651,616

1 Claim. (Cl. 35—68)

The invention relates to what are commonly known as blackboards.

Heretofore, blackboards have been made having a backing of plaster, slate or wood, but these are relatively expensive and do not readily lend themselves for use in relatively inexpensive writing devices or equipment. The main object of the present invention is to provide a blackboard in which paper such as ordinary paper or cardboard is used as a base sheet, this sheet having a roughened, black and waterproof chalk receiving surface.

A further object of the invention is to provide a blackboard formed of a plastic coated paper that can be written upon with chalk or crayon, the writing being readily removed by rubbing with a cloth, paper, felt or other erasing material, the coating being water resistant to facilitate removal of residual chalky material by wiping with a damp or wet cloth.

The invention further consists in the several features hereinafter set forth and more particularly defined by claims at the conclusion hereof.

The blackboard forming the subject of this invention may be produced in two ways. By the first method I take a sheet of paper, either light paper or cardboard, and color it black, either by printing on the same with a black ink or dye or incorporating in the fibers of the sheet during the making a black dye or pigment. To this black sheet is applied a plastic waterproof coating. This coating may be prepared with film-forming materials such as nitrocellulose, ethyl cellulose, polyvinyl acetate or copolymer of vinyl acetate and vinyl chloride, cellulose acetate, treated rubber, chlorinated rubber and similar substances suitably plasticized with any of the common plasticizers compatible with such materials such as dibutyl phthalate, castor oil, tricresyl phosphate, dioctyl phthalate, and the like with or without the addition of resinous substances such as rosin, rosin esters known as "ester gums," coumarone-indene resins, hydrogenated rosin and other derivatives of rosin, rosin modified maleic esters of glycerol, phenol-formaldehyde resins and modified phenolic resins. Natural resins such as shellac, dammar, manilla copal and the like may also be used alone or in combination with the film-forming materials listed above.

One example of the coatings for the black sheet of paper is ten parts ethyl cellulose, five parts of a glyceryl ester of hydrogenated rosin such as one known as Staybelite Ester, two parts of castor oil, the parts being by weight and dissolved in a solvent of seventy per cent toluol and thirty per cent ethyl alcohol to produce a coating which may be used on any suitable coating machine.

In a blackboard it is desirable to have a surface somewhat porous or slightly roughened to make it more receptive to chalk. This may be provided by the type of paper used for the base sheet or by incorporating into the coatings above described .1 to 5% granular abrasive substances such as quartz, silicon carbide, aluminum oxide, ground glass and the like of a particle size of two hundred grain or finer which will produce the desired abrasive or roughened surface.

I desire it to be understood that this invention is not to be limited to the specific details hereinbefore set forth except as the same are included in the appended claim.

What I claim as my invention is:

As a new article of manufacture, a blackboard comprising a black sheet of paper having a coating consisting of ten parts ethyl cellulose, five parts of a glyceryl ester of hydrogenated rosin, and two parts of castor oil, the parts being by weight and dissolved in a suitable solvent, said coating having incorporated in it .1 to 5% of a granular abrasive of at least two hundred grain.

LEON J. GOLD.

REFERENCES CITED

The following references are of record in the file of this patent:

UNITED STATES PATENTS

| Number | Name | Date |
|---|---|---|
| 123,456 | Cowdery | Feb. 6, 1872 |
| 262,528 | Winslow | Aug. 8, 1882 |
| 572,004 | Gregory | Nov. 24, 1896 |
| 2,037,038 | Morrison | Apr. 14, 1936 |

FOREIGN PATENTS

| Number | Country | Date |
|---|---|---|
| 53,454 | Switzerland | 1911 |
| 93,830 | Switzerland | 1922 |